Dec. 3, 1963
R. L. COLLINS
3,113,263
MAGNETIC RESONANCE SPECTROMETER
Filed Jan. 31, 1955
2 Sheets-Sheet 1
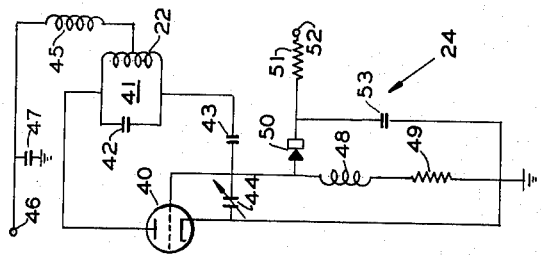
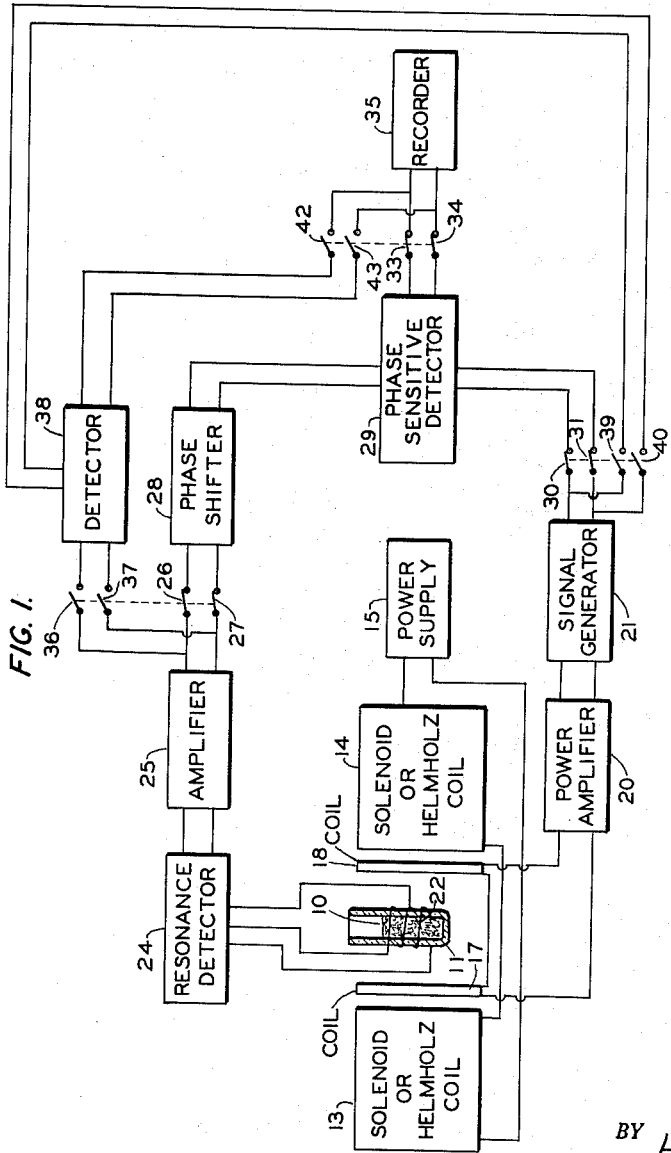
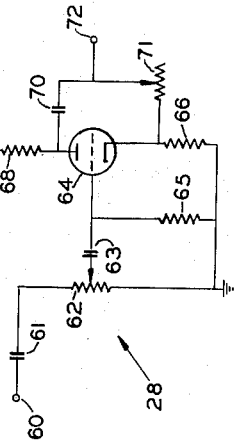
INVENTOR.
R. L. COLLINS
BY Hudson & Young
ATTORNEY

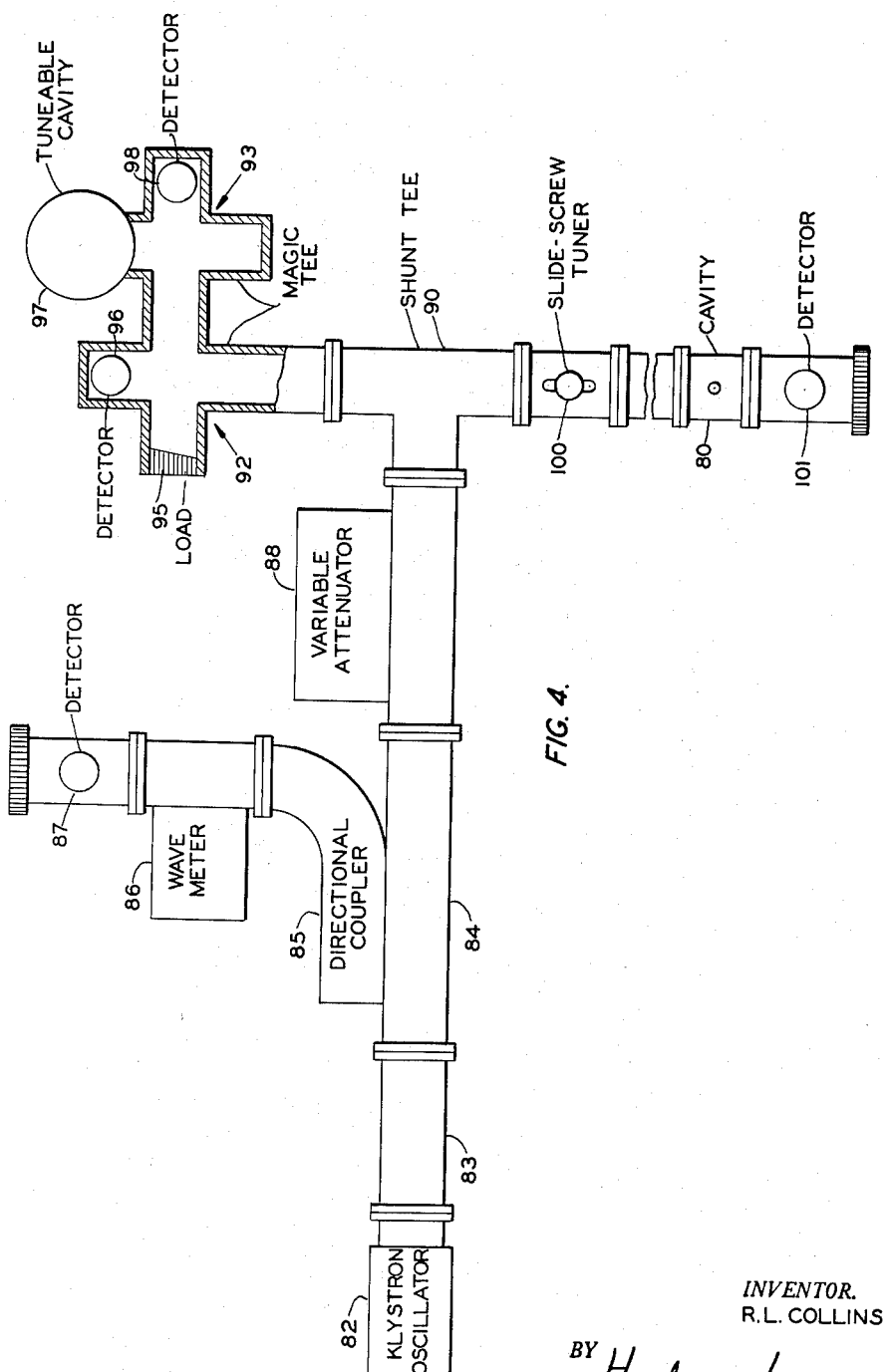

United States Patent Office 3,113,263
Patented Dec. 3, 1963

3,113,263
MAGNETIC RESONANCE SPECTROMETER
Russell L. Collins, Bartlesville, Okla., assignor to Phillips Petroleum Company, a corporation of Delaware
Filed Jan. 31, 1955, Ser. No. 485,116
16 Claims. (Cl. 324—.5)

This invention relates to a method of and apparatus for detecting particles which have a magnetic moment.

When ions or radicals having unpaired electrons are positioned in a relatively strong magnetic field, the magnetic moments of the particles tend to align themselves in one of the two possible equilibrium positions: parallel or antiparallel to the direction of the magnetic field. The relative numbers of the particles in the two positions are determined by the temperature of the material and the strength of the magnetic field. In general, there is a slight preponderance of the particles aligned with the field. In terms of classical mechanics, the particles can be thought of as bar magnets. When subjected to a magnetic field, these magnets do not quite reach the parallel or antiparallel orientations, but instead precess about the axis of the magnetic field at a rate proportional to the field strength. This precession is analogous to the action of a tipped gyroscope. The rate of precession is referred to as the Larmor frequency. If the particles so aligned in a magnetic field are subjected to a second magnetic field at right angles to the first field and fluctuating at the Larmor frequency, transitions of the particles from one position to the other are induced. This phenomena is referred to as paramagnetic resonance.

In accordance with the present invention, a system is provided for detecting the presence of ions and radicals having unpaired electrons in terms of paramagnetic resonance of the particles. A sample of material to be analyzed is positioned in a first magnetic field, which can be produced by Helmholz coils or solenoids. A coil, which forms the inductance of a tank circuit of an oscillator, is positioned about the sample of material so that the axis of the coil is at right angles to the magnetic field. If the frequency of the oscillator is equal to the Larmor precession rate, the magnetic field of the oscillator coil interacts with the spinning particles. This can be visualized by resolving the oscillating magnetic vector of the oscillator coil field into two circularly polarized field vectors rotating at the same frequency but in opposite directions. The field vector rotating with the magnetic moments of the particles flips the particles into the opposite orientations; the component rotating in the opposite sense averages out to zero and can be neglected. Transitions of the particles from the two orientations are equally probable. However, since the lower energy level (parallel to the magnetic field) is more populous, a small net amount of energy is removed from the oscillator coil. A measurement of this energy removal provides an indication of the paramagnetic material in the sample being analyzed. In order to provide a readily measurable signal, the magnetic field is varied from a first value through the resonant value and back again at a predetermined frequency, which frequency is considerably lower than the frequency of the oscillator. The output of the oscillator is thus modulated at the predetermined frequency. In some instances the oscillator coil can be aligned to produce a magnetic field at angles other than at right angles to the first magnetic field.

In another method of operating the apparatus of this invention, the magnetic field is varied periodically from beyond the resonance value in one direction to beyond the resonance value in the opposite direction. Several wave forms of the modulating field are employed for the several embodiments of the modulation described herein.

In another aspect of this invention, a stronger magnetic field and frequencies in the microwave range are utilized. This involves the use of microwave apparatus in one embodiment.

Accordingly, it is an object of this invention to provide a method of and apparatus for detecting ions and radicals having unpaired electrons.

Another object is to provide improved methods of modulating magnetic resonance spectrometers to scan resonance peaks.

A further object is to provide a magnetic resonance spectrometer of such form as to be useful for process monitoring and control operations.

Other objects, advantages and features of this invention should become apparent from the following description taken in conjunction with the accompanying drawing in which:

FIGURE 1 is a schematic representation of the resonance spectrometer of this invention;

FIGURE 2 is a detailed circuit diagram of the resonance detector of FIGURE 1;

FIGURE 3 is a detailed circuit diagram of the phase shifter of FIGURE 1; and

FIGURE 4 is a schematic representation of microwave components employed in conjunction with strong magnetic fields.

Referring now to the drawing in detail, and to FIGURE 1 in particular, there is shown a schematic representation of apparatus employed to detect paramagnetic resonance with relatively low magnetic fields and frequencies in the radio frequency range. A sample of material 10 to be analyzed is disposed in a suitable container 11 which is positioned in a magnetic field formed by a pair of solenoids or Helmholz coils 13 and 14. Coils 13 and 14 are energized from a direct current power supply 15. A second pair of coils 17 and 18 is positioned adjacent coils 13 and 14 to vary the magnetic field formed by coils 13 and 14. Coils 17 and 18 are energized from the output of a power amplifier 20, which in turn is energized from a signal generator 21. Generator 21 can provide alternating current signals of various wave forms and at various frequencies, as described in greater detail hereinafter.

Container 11 is surrounded by a coil 22 which is positioned such that its axis is at right angles to the magnetic field formed by coils 13 and 14. Coil 22 forms the inductance in the tuned circuit of an oscillator which forms an element of the resonance detector 24. The output terminals of resonance detector 24 are connected to the input terminals of a tuned amplifier 25. The output terminals of amplifier 25 are connected through ganged switches 26 and 27 to the input terminals of a phase shift circuit 28. The output terminals of circuit 28 are connected to the first input terminals of a phase sensitive detector 29. The second input terminals of detector 29 are connected through ganged switches 30 and 31 to the output terminals of signal generator 21. The output terminals of detector 29 are connected through ganged switches 33 and 34 to the input terminals of a voltage indicator, such as a recorder 35. The output terminals of amplifier 25 are also connected through ganged switches 36 and 37 to the input terminals of a detector circuit 38. The output terminals of signal generator 21 are connected through ganged switches 39 and 40 to the second input terminals of detector 38. The output terminals of detector 38 are connected through ganged switches 42 and 43 to the input terminals of recorder 35.

Resonance detector 24 is illustrated in detail in FIGURE 2. This detector comprises an oscillator which is tuned to a frequency in the radio frequency range. The cathode of a triode 40 is connected to ground, and the anode of triode 40 is connected to one terminal of a tank circuit 41 which comprises a capacitor 42 and coil 22 connected in parallel relationship. The second terminal of tank circuit 41 is connected through a capacitor 43 to the control grid of triode 40. A variable capacitor 44 is connected between the cathode and control grid of triode 40. A center tap on coil 22 is connected through a radio frequency choke coil 45 to a positive potential terminal 46. A capacitor 47 is connected between terminal 46 and ground. The junction between capacitors 43 and 44 is connected to ground through a radio frequency choke coil 48 and a resistor 49 which are connected in series relationship. The junction between capacitors 43 and 44 is also connected through a rectifier 50 and a resistor 51 to the first output terminal 52 of the detector. A capacitor 53 is connected between ground and the junction between rectifier 50 and resistor 51.

A suitable phase shift circuit 28 is illustrated in detail in FIGURE 3. The first input terminal 60 is connected through a capacitor 61 to one end terminal of a potentiometer 62. The second end terminal of potentiometer 62 is connected to ground, which forms the second input terminal of the phase shift circuit. The contactor of potentiometer 62 is connected through a capacitor 63 to the control grid of a triode 64. The control grid of triode 64 is connected to ground through a resistor 65. The cathode of triode 64 is connected to ground through a resistor 66, and the anode of triode 64 is connected to a positive potential terminal 67 through a resistor 68. The anode of triode 64 is connected to the cathode thereof through a capacitor 70 and a variable resistor 71 which are connected in series relationship. The junction between capacitor 70 and resistor 71 is connected to the first output terminal 72 of the phase shift circuit, the second output terminal being ground. The input signal applied to the network 28 is thus amplified by triode 64 and applied to the output terminals. Adjustment of resistor 71 varies the phase of the output signal with respect to the phase of the input signal applied to network 28.

In a first method of operating the apparatus of this invention, generator 21 is selected to provide pulses of sinusoidal or substantially sinusoidal wave form. Switches 39, 40, 36, 37, 42 and 43 are closed and swiftches 30, 31, 26, 27, 33 and 34 are opened. The output of power supply 15 is adjusted so that the magnetic field created by coils 13 and 14 is equal to the earth's magnetic field and is aligned to balance out the earth's magnetic field. Thus, the sole magnetic field exerted on sample material 10 is that created by coils 17 and 18 and, of course, 22. The magnitude of the magnetic field created by coils 17 and 18 is adjusted to vary periodically from zero to the resonance value, back to zero, to the resonance value in the opposite direction, and finally back to zero. This represents one cycle of the output signal from signal generator 21. For convenience, the frequency of generator 21 can be sixty cycles per second. The magnitude of the resonance value of the magnetic field is a function of the frequency $f$ of the oscillator in detector 24. This relationship is approximately as follows:

$$f = 2.8 \text{ megacycles/gauss}$$

If coils 17 and 18 provide a magnetic field of maximum value of ten gausses, for example, the frequency of the oscillator in detector 24 is adjusted to twenty-eight megacycles per second. As previously mentioned, at resonance, energy is transferred from coil 22 to sample material 10 to reverse the alignment of the paramagnetic particles therein. The voltage at the control grid of triode 40 is thus reduced in magnitude by this transfer of energy at twice the frequency of generator 21 because the magnetic field created by coils 17 and 18 reaches the resonance value twice per cycle. The voltage at the control grid of triode 40 is rectified, filtered and applied to amplifier 25. Amplifier 25 preferably is tuned to pass only frequencies of twice the frequency of generator 21. The required frequency may be other than twice the frequency of signal generator 21, although it will be a multiple of that frequency. The detector 38 contains a phase shifter, a phase sensitive detector, and a harmonic selector and filter. If the frequency to which the phase sensitive detector within 38 is to be tuned is twice the frequency of the signal generator 21, then the harmonic selector is adjusted to yield a pure second harmonic of the wave emitted by 21. The output signal of this detector thus is a D.C. voltage of magnitude representative of the number of paramagnetic particles in sample 10. This signal is applied to recorder 35.

This first method of operation is advantageous because the detected signal is of different frequency than the signal of generator 21. Amplifier 25 can be tuned to reject signals of the frequency of generator 21 (60 cycles) to avoid the effect of stray voltage signals being measured by the detecting circuit.

In a second method of operating the apparatus of this invention, coils 13 and 14 are not needed. Generator 21 is selected to provide half wave pulses at a first frequency. The magnitude of these pulses is such as to create a magnetic field of resonance value during at least a portion of each pulse. It is preferred that the pulses be substantially square waves, but this is not essential. Switches 30, 31, 26, 27, 33 and 34 are closed and switches 39, 40, 36, 37, 42 and 43 are opened. The magnitude of the output signal of detector 24 is thus decreased periodically at the frequency of generator 21. This output signal is amplified by amplifier 25, which is now tuned to pass the frequency of generator 21. The phase of the output signal from amplifier 25 is varied as necessary to compensate for any phase shift. This is provided by adjustment of potentiometer 71 so that the two signals applied to detector 29 are in phase with one another. The magnitude of the output signal from detector 29 again represents the number of paramagnetic particles in sample 10. If a field stronger than a few gausses is employed, it may be preferable to utilize the second method in a slightly different form. A biasing field is provided by coils 13 and 14 such as to nearly attain the resonance condition. The second method is then applied.

In a third embodiment of this invention a considerably stronger magnetic field is employed. This field is created by coils 13 and 14 and can be of the order of 3000 gausses, for example. If a magnetic field of 3000 gausses is used, the corresponding resonance frequency is of the order of $8.4 \times 10^9$ cycles per second. This frequency is in the X-band microwave range. A magnetic field corresponding to the resonance value is created by coils 13 and 14. A modulating magnetic field of the order of ten gausses peak-to-peak, for example, is created by coils 17 and 18. Generator 21 can provide square waves or any other conveniently generated wave form. This modulating magnetic field serves to sweep the resultant total magnetic field through the resonance value periodically. The apparatus illustrated in FIGURE 4 can be employed as resonance detector 24 of FIGURE 1 to accommodate the higher frequencies.

The sample material 10 is inserted into the center of a cavity 80 which is located in the magnetic field. Cavity 80 is a section of a wave guide which is closed at each end by a conductive wall. The walls are one wave length apart and have narrow openings for coupling purposes. A standing wave is excited in cavity 80. This wave has nodes in the electrical field at each end and at the center, while the magnetic field is a maximum at these positions. Thus, the center of the cavity is the desired location for the sample because the magnetic interaction is a maximum and detuning of the cavity after insertion of the sample is a minimum.

The microwave power is generated by a klystron oscillator 82 which is tuned to the desired frequency of $8.4 \times 10^9$ cycles per second, for example. The output power is transmitted through a unidirectional transmission line 83 which is a rectangular wave guide of 0.4 by 0.9 inch rectangular cross-section. This unidirectional transmission line utilizes the Faraday effect to prevent frequency pulling of oscillator 82 by a reactive load. Approximately one percent of the power is deflected by a directional coupler 85 to a reaction frequency meter 86 and tunable detector 87. The remainder of the microwave power enters a shunt T 90. The magnitude of the power entering T 90 is regulated by a variable attenuator 88. A portion of the power from T 90 is directed into a stabilizer circuit, where its frequency is compared with that of a high-Q cavity 97. The stabilizer circuit comprises a pair of magic T's 92 and 93. A load 95 and a detector 96 is in T 92 and a detector 98 and a cavity 97 are in T 93. The outputs of detectors 96 and 98 are compared and a voltage representative of the difference therebetween can be employed to vary the klystron reflector voltage to minimize the frequency difference. The remainder of the power entering shunt T 90 passes through a slide-screw tuner 100 and the sample cavity 80 to a detector 101. Silicon diode crystals or bolometers, for example, can be used as detector 101. The slide-screw tuner 100 introduces a compensating discontinuity into the waveguide to cancel the standing waves set up by the coupling iris of cavity 80. The output of detector 101 is connected to amplifier 25 of FIGURE 1.

In dilute solution of free radicals, a hyperfine structure often occurs. Considering diphenyl picryl hydrazyl, for example, five resonance peaks are resolvable at concentrations below approximately 0.002 molar. In detecting such substances, and especially when the spacings between peaks is uniform, generator 21 is selected to have a sawtooth or similar waveform. The amplitude of the magnetic field is varied sufficiently to encompass all the resonance peaks. The field is biased to the center of the resonances. In the diphenyl picryl hydrazyl example, the output of detector 24 varies at a rate of two times five, or ten times the modulation frequency of generator 20. Detector 38 is employed in making this measurement and amplifier 25 is tuned to pass signals of frequency ten times the frequency or generator 21. This arrangement provides higher sensitivity, a continuous output signal, a specific indication of a particular free radical, and a system wherein the modulating frequency can easily be filtered from the measured signal. This arrangement can be used with either the high or low magnetic field, and even when only one component exists.

In some applications of this invention it is desirable to apply the alternating magnetic field at angles other than at right angles to the first magnetic field. These angles can vary from the two fields being parallel to the two fields being at right angles.

From the foregoing description of preferred embodiments of this invention it can be seen that improved methods of and apparatus for detecting the presence of paramagnetic substances are provided. The principles of this invention can also be employed to detect nuclear particles having magnetic moments. The modulating methods of this invention greatly simplify the detection of the condition of resonance. While the invention has been described in conjunction with present preferred embodiments, it should be apparent that the invention is not limited thereto.

What is claimed is:

1. Apparatus for identifying substances having a magnetic moment comprising a container for the substance to be detected, means to establish a first alternating magnetic field of a first frequency through said container, a coil positioned with respect to said container so that passage of electric current through said coil establishes a second magnetic field through said container at right angles to said first magnetic field, a source of alternating current connected to said coil, said source of alternating current being of such amplitude as to vary said second magnetic field from at least the resonance value for the material to be detected in a first direction to at least the resonance value in the opposite direction, and means to measure the energy imparted to the substance to be detected from said means to establish said first magnetic field.

2. The combination in accordance with claim 1 wherein said second magnetic field varies in magnitude in substantially a sinusoidal manner.

3. The combination in accordance with claim 1 further comprising means to establish a third magnetic field through said container of magnitude equal to and in a direction opposite to the magnetic field of the earth at the region of said container.

4. The combination in accordance with claim 1 wherein said means to establish said first magnetic field comprises an oscillator having a tank circuit therein, the inductance coil of said tank circuit enclosing said container, and wherein said means to measure energy comprises means to measure the energy loss from said tank circuit at a frequency which is a harmonic of the frequency at which said second magnetic field is varied.

5. The combination in accordance with claim 4 wherein said oscillator comprises a vacuum tube having a cathode, an anode and a control grid, means connecting one terminal of said tank circuit to said anode, a source of potential, means connecting said source of potential to the center tap of said coil, a first capacitor connected between said control grid and the second terminal of said tank circuit, and a second capacitor connected between said cathode and said control grid.

6. The combination in accordance with claim 5 wherein said means to measure energy imparted to said substance comprises an impedance connected between said control grid and a point of reference potential which is more negative than said source of potential, and means to measure the potential drop across said impedance.

7. The combination in accordance with claim 1 wherein said container comprises a waveguide cavity, and wherein said means to establish said first magnetic field comprises an oscillator of microwave frequency, and waveguide means connected between said oscillator and said cavity, said cavity having a conductive wall at each end thereof, said walls having openings therein, said walls being substantially one wavelength apart at the frequency of said oscillator, and the substance to be detected being positioned at the center of said cavity.

8. The combination in accordance with claim 7 wherein said means to measure the energy imparted to the substance to be detected comprises a detector positioned adjacent said cavity on the side thereof opposite said oscillator.

9. The combination in accordance with claim 1 wherein said first frequency is related to said resonance values of said second magnetic field by the expression:

$$f = 2.8 \text{ megacycles/gauss}$$

where $f$ is said first frequency.

10. The combination in accordance with claim 1 wherein said second magnetic field is varied at a second frequency, and wherein said means to measure the energy imparted to the substance to be detected includes means to transmit only signals of frequency twice said second frequency.

11. The combination in accordance with claim 1 wherein said second magnetic field is varied at a second frequency, and wherein said means to measure the energy imparted to the substance to be detected includes means to transmit only signals of a frequency that is a harmonic of said second frequency.

12. Apparatus for identifying substances having a magnetic moment which exhibits a hyperfine structure at resonance comprising a container for the substance to be detected, means to establish a first alternating magnetic field of a first frequency through said container, a coil positioned with respect to said container so that passage of electric current through said coil establishes a second magnetic field through said container at right angles to said first magnetic field, a source of alternating current connected to said coil, said source of alternating current being of such amplitude as to vary said second magnetic field from at least the resonance value for the material to be detected in a first direction to at least the resonance value in the opposite direction, and means to measure the energy imparted to the substance to be detected from said means to establish said first magnetic field, said means to measure including means to transmit only signals which are at a frequency that is an even harmonic of the frequency at which said second magnetic field is varied.

13. Apparatus for identifying substances having a magnetic moment comprising a container for the substance to be detected, means to establish a first alternating magnetic field of a first frequency through said container, a coil positioned with respect to said container so that passage of electric current through said coil establishes a second magnetic field through said container at right angles to said first magnetic field, a source of alternating current connected to said coil, said source of alternating current being of such amplitude as to vary said second magnetic field from at least the resonance value for the material to be detected in a first direction to at least the resonance value in the opposite direction and means to measure the energy imparted to the substance to be detected from said means to establish said first magnetic field, said means to measure including means to transmit signals which are of a frequency equal to the product of an integer times the frequency at which said second magnetic field is varied.

14. The method of identifying substances having a magnetic moment which comprises applying a first alternating magnetic field of a first frequency across a zone containing the substance to be identified, applying a second magnetic field across said zone at right angles to said first magnetic field, changing the magnitude and direction of said second magnetic field periodically so that said second magnetic field varies periodically from at least the resonance value for the material to be detected in a first direction to at least the resonance value in the opposite direction, and measuring the energy imparted to the substance to be detected from said first magnetic field.

15. The method of claim 14 further comprising the step of applying a third magnetic field across said zone which is equal to and is in a direction opposite to the magnetic field of the earth at the region of said zone.

16. The method of claim 14 wherein said first frequency $f$ is related to said resonance values of said second magnetic field by the expression:

$$f = 2.8 \text{ megacycles/gauss}$$

References Cited in the file of this patent

UNITED STATES PATENTS

Re. 23,950  Bloch et al. _____ Feb. 22, 1955

OTHER REFERENCES

Ferromagnetic Resonance in Nickel Ferrite, by Yager, Galt, Merritt, and Wood, Physical Review, vol. 80, No. 4, Nov. 15, 1950, pp. 744–748.

Apparatus for Nuclear Magnetic Resonance, by Gutowsky, Meyer, and McClure, Review of Scientific Instruments, vol. 24, No. 8, August 1953, pp. 644–652.

Free Magnetic Induction in Nuclear Quadrupole Resonance, by Bloom, Hahn, and Herzog, Physical Review, vol. 97, No. 6, March 15, 1955, pp. 1699–1709.

Philosophical Magazine, vol. 45, No. 370, November 1954, pp. 1221–1223.

Staub et al.: Helvetica Phisica Acta, vol. 23, No. 49, 1950, pp. 63 through 92.

Gutowsky et al.: The Review of Scientific Instruments, vol. 24, No. 8, August 1953, pp. 644 through 651.

Reif et al.: Physical Review, vol. 91, No. 3, August 1953, pp. 631 to 641.

Pound et al.: Review of Scientific Instruments, vol. 21, No. 3, March 1950, pp. 219 to 225.

Beringer et al.: Physical Review, vol. 81, No. 1, Jan. 1, 1951, pp. 82 to 88.

Beringer et al.: Physical Review, vol. 78, No. 5, June 1, 1950, pp. 581 to 586.

Brown: Physical Review, vol. 78, No. 5, pp. 530–532, June 1, 1950.